Aug. 19, 1924.
J. TODD
1,505,750
OPERATION OF OZONE MACHINES
Original Filed June 10, 1922
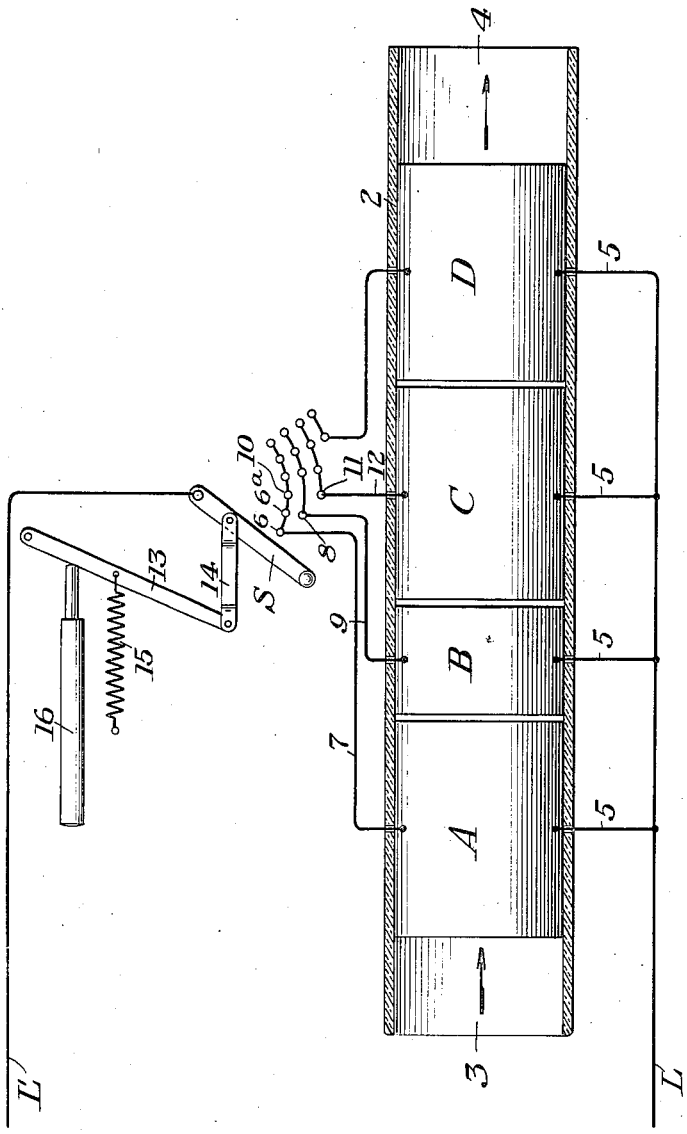
INVENTOR
James Todd, Patented Aug. 19, 1924.

1,505,750

UNITED STATES PATENT OFFICE.

JAMES TODD, OF SEWICKLEY, PENNSYLVANIA, ASSIGNOR TO ALEXANDER C. TENER, TRUSTEE, OF PITTSBURGH, PENNSYLVANIA.

OPERATION OF OZONE MACHINES.

Application filed June 10, 1922, Serial No. 567,483. Renewed May 29, 1924.

*To all whom it may concern:*

Be it known that I, JAMES TODD, a citizen of the United States, residing at Sewickley, in the county of Allegheny and State of Pennsylvania, have invented a new and useful Improvement in the Operation of Ozone Machines, of which the following is a full, clear, and exact description, reference being had to the accompanying drawings, forming part of this specification, in which the figure is a diagrammatic illustration of one form of apparatus for carrying out my invention.

Heretofore in the operation of ozone machines, there has been no attempt to vary the effective electrode area of the ozonizing apparatus to compensate for changes brought about by the changes of the temperature of the surrounding atmosphere from which the air is drawn and passed to the ozonizing machine.

I have discovered as set forth in my prior Patent, No. 1,066,065 of July 1, 1913, that with the same ozone machine, a certain strength of gas will be given at a relatively low atmospheric temperature, while with the same amount of air at a relatively higher atmospheric temperature, the ozone constituent of the treated air will almost entirely disappear. In other words, I have found that the strength of the so-called ozonized air varies with the temperature of the atmosphere from which it is drawn. For example, a given quantity of air drawn into the ozonizer at a temperature of 5° C. will give a certain strength of the so-called ozonized air, while at an atmospheric temperature of 20°, the ozonized air is much weaker. At a temperature of from 30° to 35° C. in the external atmosphere, the so-called ozone constituent becomes almost negligible.

I have also discovered that I can greatly reduce or overcome these great variations in the "ozone" percentage by increasing the effective electrode area of the ozonizing apparatus as the temperature of the atmosphere rises and decreasing the effective electrode area as the temperature of the atmosphere falls.

It will be apparent that many different kinds and arrangements of apparatus may be utilized in accordance with the present invention for obtaining the desired results.

In accordance with one embodiment of my invention, as illustrated in the drawings, there may be provided an ozonizing apparatus comprising a series of ozone generators or ozonizers A B C D etc. These generators or ozonizers may be in the form of separate units or may be in the form of sections of the same apparatus. The different ozonizers may be mounted within a glass tube or other casing 2, having an inlet 3 for the external air to be treated and an outlet 4 for the treated air.

The ozonizers are preferably arranged in such manner that they exert a serial effect on the air being treated. In the embodiment of the invention illustrated, each of the ozonizers may have an electrical connection 5 with a line wire L. The circuit through the ozonizers to the line wire L' may be completed through a switch or switches S. As illustrated, this switch may be of the rotary type adapted when moved to its first position from that shown in the drawings to engage a contact 6, having an electrical connection 7 with the ozonizers A. At this time, the remaining ozonizers will be inoperative and the external air will be subjected only to treatment within the ozonizer A. This condition will prevail at comparatively low temperatures. As the temperature rises with the result of a corresponding decrease in the so-called ozone constituent, the switch may be moved to its second position, where it will engage the contact 6ª connected to the ozonizer A and the contact 8 connected to the ozonizer B, through the wire 9. The ozonizer B preferably has an effective electrode area which is less than, for example, one-half, the effective electrode area of the ozonizer A. This subjects the air to a greater electrode surface and tends to compensate for the increase in temperature. Upon a further rise in temperature, the switch may be moved to its third position where it will engage the contact 10 in electrical connection with the ozonizer A and also the contact 11, connected through the wire 12 to the ozonizer C. This makes the ozonizers A, C operative on the air and cuts out the ozonizer B. As will be apparent, the next movement of the switch will bring the ozonizers A, C and B all into circuit. These operations may be repeated as desired, in accordance with the number of ozonizers, whereby the effective electrode area for treating the air may be gradually increased in the ratio desired.

While the switch for controlling the ozonizers may, if desired, be manually operated, I may provide thermostatic means for operating the same in accordance with variations in the temperature of the air. As illustrated, this means may comprise a pivotally mounted actuating lever 13, having a link connection 14 with the switch S. The actuating lever may be normally held in a direction to maintain the switch S in its neutral position by means of a spring 15, and may be moved in the opposite direction in accordance with temperature changes by thermostatic device 16 of any usual construction.

It will be apparent that the thermostatic device may be of the direct acting type and the contacts so arranged that they will be engaged at the proper times, or the thermostat may be provided with a plurality of compounding levers, as is customary in the art, for imparting a predetermined movement to the actuating member for certain temperature changes.

As illustrated in my prior patent, referred to herein, I may provide a pump or blower for the purpose of either forcing or drawing the air to be treated through ozonizers.

I have found that I may produce the desired results within the range of temperatures of atmospheric air, usually encountered, by varying the electrode area of the ozonizing apparatus from approximately six inches to approximately thirty inches. It will be apparent, however, that the exact limits within which the effective electrode area of the ozonizing apparatus is varied is immaterial.

In my co-pending application Serial No. 567,484, filed June 10, 1922, I have disclosed and claimed the idea of automatically maintaining the ozone constituents substantially constant in a given body of air.

The advantages of my invention will be obvious to those skilled in the art, since it provides a method for obtaining an ozonized air of uniform characteristics. My invention insures the production of a comparatively regular or uniform constituent, thereby enabling uniform results to be obtained from its use, irrespective of temperature changes. In this respect, my invention differs radically from that disclosed, for example, in the patent to Bayeux et al., No. 1,326,631, of December 30, 1919, in which the changes in the effective solenoid windings are not made with respect to temperature conditions, but are made solely for the purpose of varying the ozonizing power of the apparatus.

I claim:

1. In the manufacture of so-called ozonized air, the step consisting of varying the effective electrode area of an ozonizer according to the temperature of the atmosphere, substantially as described.

2. In the manufacture of so-called ozonized air, the step consisting in decreasing the effective electrode area as the temperature of the atmosphere decreases, substantially as described.

3. In the manufacture of so-called ozonized air, the step consisting in increasing the effective electrode area of the ozonizer as the temperature of the atmosphere increases, substantially as described.

4. In the manufacture of so-called ozonized air, the steps consisting in varying the effective electrode area of the ozonizer in approximate proportion to the temperature of the atmosphere, decreasing the effective electrode area as the temperature decreases, and increasing it as the temperature increases, substantially as described.

5. In the manufacture of so-called ozonized air, the step consisting in varying the effective electrode area of the ozonizer, and decreasing the effective area as the temperature decreases and increasing the effective area as the temperature increases, substantially as described.

6. In the manufacture of so-called ozonized air, the step consisting in automatically varying the effective electrode area of an ozonizer according to the temperature of the atmosphere, substantially as described.

In testimony whereof I have hereunto set my hand.

JAMES TODD.